United States Patent

Coffeen

[11] Patent Number: 5,997,098
[45] Date of Patent: Dec. 7, 1999

[54] SHOULDER BELT POSITIONER

[75] Inventor: Jared P. Coffeen, Troy, Ohio

[73] Assignee: Evenflo Company, Inc., Vandalia, Ohio

[21] Appl. No.: 09/177,174

[22] Filed: Oct. 22, 1998

[51] Int. Cl.⁶ .................................................. B60N 2/28
[52] U.S. Cl. ...................................... 297/483; 297/250.1
[58] Field of Search .................................... 297/468, 483, 297/484, 250.1; 280/808

[56] References Cited

U.S. PATENT DOCUMENTS

| 4,662,683 | 5/1987 | Knoedler et al. |
| 4,998,307 | 3/1991 | Cone |
| 5,115,523 | 5/1992 | Cone |
| 5,733,004 | 3/1998 | Celestina-Krevh et al. ........ 297/483 X |

FOREIGN PATENT DOCUMENTS 3513220 10/1986 Germany ............................. 297/483

Primary Examiner—Peter R. Brown
Attorney, Agent, or Firm—Thompson Hine & Flory LLP

[57] ABSTRACT

A toddler booster car seat is disclosed. The toddler booster car seat comprises a rigid frame including a generally horizontally disposed seat portion with an upper surface for receiving the seat of a child and a lower surface for being positioned on the seat of a vehicle. The frame also includes a back portion integrally formed with the seat portion and extending generally upwardly from the rear edge of the seat portion. The rigid frame of the back portion is formed with rigid lateral edges. A plurality of apertures is formed in the back portion of the frame. At least one positioning member is formed with a plurality of apertures located therethrough adjacent to its inner edge with a plurality of notches extending inwardly from the outer edge. Each notch has a narrow linear radial extent terminating in an enlarged circumferential extent adapted to receive the fabric of a vehicle seat belt. A plurality of fasteners extend through the apertures of the frame and positioning members.

6 Claims, 2 Drawing Sheets

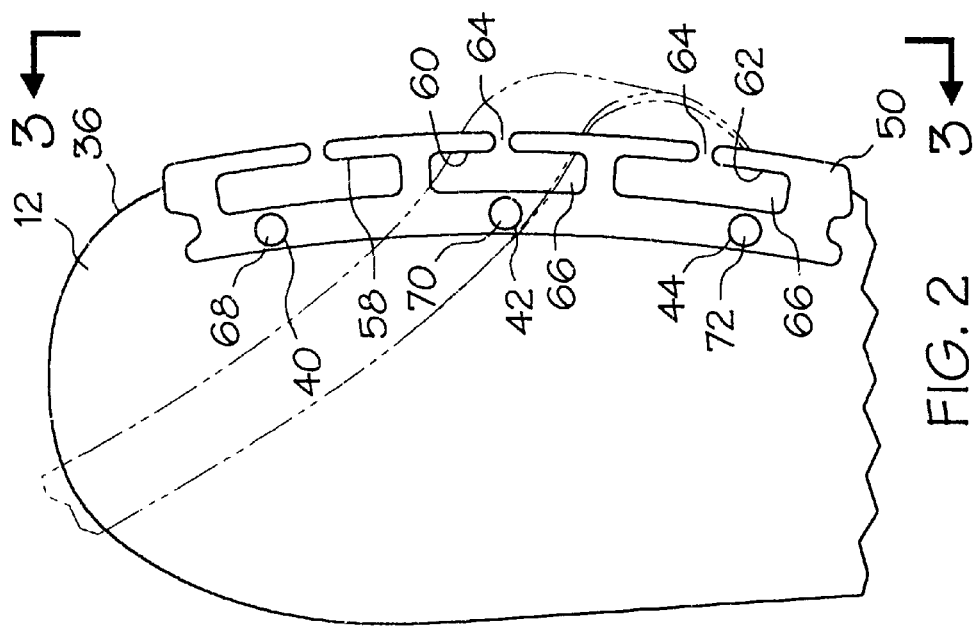
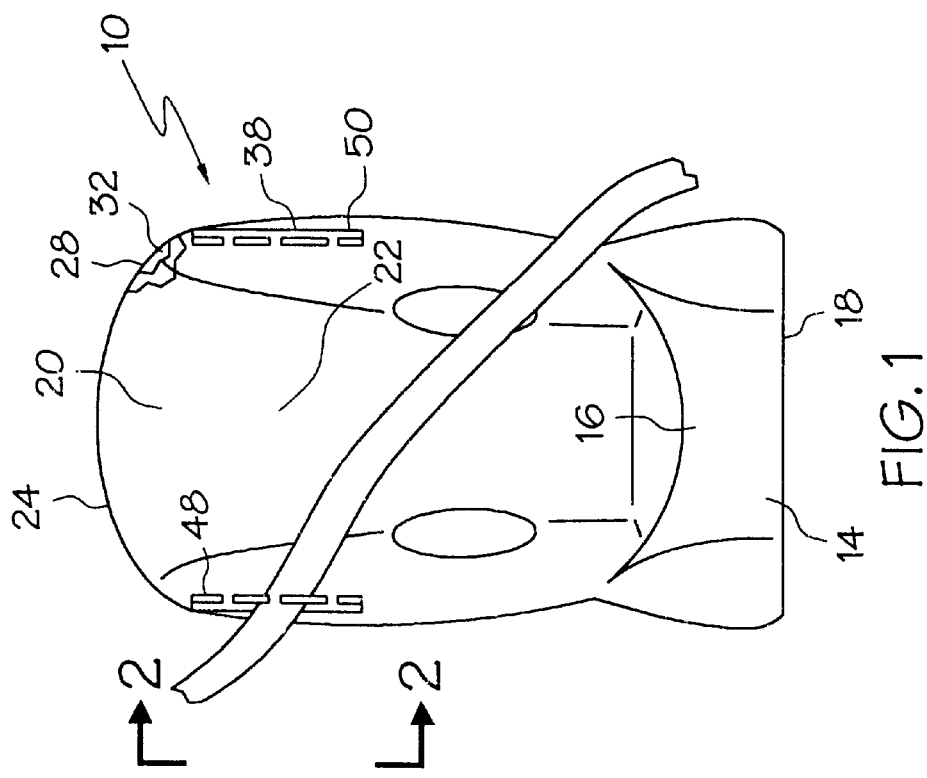

SHOULDER BELT POSITIONER

BACKGROUND OF THE INVENTION

1. Field of the Invention

The present invention relates to a new and improved toddler booster seat with a vehicle shoulder belt positioner and, more particularly, pertains to releasably securing a toddler booster seat to a vehicle seat through a vehicle seat belt in a safe, convenient and comfortable manner.

2. Description of the Prior Art

The use of car seats and booster seats of known designs and configurations is known in the prior art. More specifically, car seats and booster seats of known designs and configurations heretofore devised and utilized for the purpose of securing childcare products to vehicle carseats through known methods and apparatuses are known to consist basically of familiar, expected, and obvious structural configurations, notwithstanding the myriad of designs encompassed by the crowded prior art which has been developed for the fulfillment of countless objectives and requirements.

The prior art discloses a large number of car seats and booster seats of known designs and configurations. By way of example, U.S. Pat. No. 5,115,523 to Cone, issued May 26, 1992, discloses a convertible infant restraint device.

U.S. Pat. No. 4,998,307 to Cone, issued Mar. 12, 1991, also discloses a convertible infant restraint device.

Lastly, U.S. Pat. No. 4,662,683 to Knoedler et al., issued May 5, 1987, discloses a juvenile car seat.

In this respect, the toddler booster seat with a vehicle shoulder belt positioner according to the present invention substantially departs from the conventional concepts and designs of the prior art, and in doing so provides an apparatus primarily developed for the purpose of releasably securing a toddler booster seat to a vehicle seat through a vehicle seat belt in a safe, convenient and comfortable manner.

Therefore, it can be appreciated that there exists a continuing need for a new and improved toddler booster seat with a vehicle shoulder belt positioner which can be used for releasably securing a toddler booster seat to a vehicle seat through a vehicle seat belt in a safe, convenient and comfortable manner. In this regard, the present invention substantially fulfills this need.

SUMMARY OF THE INVENTION

In view of the foregoing disadvantages inherent in the known types of car seats and booster seats of known designs and configurations now present in the prior art, the present invention provides a new and improved toddler booster seat with a vehicle shoulder belt positioner. As such, the general purpose of the present invention, which will be described subsequently in greater detail, is to provide a new and improved a toddler booster seat with a vehicle shoulder belt positioner and methods which have all the advantages of the prior art and none of the disadvantages.

To attain this, the present invention essentially comprises a new and improved toddler booster car seat with a vehicle shoulder belt positioner for releasable securement to a vehicle seat through a vehicle seat belt comprising, in combination, a rigid frame including a generally horizontally disposed seat portion with an upper surface for receiving the seat of a child and a lower surface for being positioned on the seat of a vehicle, the frame also including a back portion integrally formed with the seat portion with an exterior surface for receiving the back of a child and an interior surface for being positioned on the back of a vehicle seat, and extending generally upwardly from the rear edge of the seat portion; a fabric cover over the booster seat frame; padding located between the fabric and rigid frame; the rigid frame of the back portion being formed with rigid lateral edges and with the fabric thereadjacent being formed with elongated apertures; three apertures formed in the back portion of the frame in the upper extent thereof with their centers in an arcuate configuration; a pair of generally rigid plastic positioning members of a similar configuration formed in an arcuate configuration and symmetrically formed from top to bottom with three apertures located through each member adjacent to its inner edge, each aperture having an enlarged cylindrical end for receiving a rivet head and with three T-shaped notches extending inwardly from the outer edge, each T-shaped notch having a narrow linear radial extent terminating in an enlarged circumferential extent adapted to receive the fabric of a vehicle seat belt, the portions of the positioning members on opposite sides of the radial extents having a circular cross-sectional configuration, the outer edge being beveled along its length at an angle toward the enlarged cylindrical ends and the inner edge being planar for contacting the frame with its apertures in axial alignment with the apertures of the frame; and three rivets extending through the apertures of the frame for holding the positioning members to the frame interior of the fabric with the T-shaped notches extending through the elongated apertures to exterior of the fabric.

There has been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved toddler booster seat with a vehicle shoulder belt positioner which has all the advantages of the prior art car seats and booster seats of known designs and configurations and none of the disadvantages.

It is another object of the present invention to provide a new and improved toddler booster seat with a vehicle shoulder belt positioner which may be easily and efficiently manufactured and marketed.

It is a further object of the present invention to provide a new and improved toddler booster seat with a vehicle shoulder belt positioner which is of a durable and reliable construction.

An even further object of the present invention is to provide a new and improved toddler booster seat with a vehicle shoulder belt positioner which is susceptible of a low cost of manufacture with regard to both materials and labor, and which accordingly is then susceptible of low prices of sale to the consuming public, thereby making such a toddler booster seat with a vehicle shoulder belt positioner economically available to the buying public.

Even still another object of the present invention is to releasably secure a toddler booster seat to a vehicle seat through a vehicle seat belt in a safe, convenient and comfortable manner.

Lastly, it is an object of the present invention to provide a toddler booster car seat comprising a rigid frame including a generally horizontally disposed seat portion with an upper surface for receiving the seat of a child and a lower surface for being positioned on the seat of a vehicle. The frame also includes a back portion integrally formed with the seat portion and extending generally upwardly from the rear edge of the seat portion. The rigid frame of the back portion is formed with rigid lateral edges. A plurality of apertures is formed in the back portion of the frame. At least one positioning member is formed with a plurality of apertures located therethrough adjacent to its inner edge with a plurality of notches extending inwardly from the outer edge. Each notch has a narrow linear radial extent terminating in an enlarged circumferential extent adapted to receive the fabric of a vehicle seat belt. A plurality of fasteners extend through the apertures of the frame and positioning members.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated the preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a front elevational view of the new and improved toddler booster seat with a vehicle shoulder belt positioner constructed in accordance with the principles of the present invention FIG. 2 is a side elevational view of the present invention taken at line 2—2 of FIG. 1.

The same reference numerals refer to the same parts throughout the various Figures.

DESCRIPTION OF THE PREFERRED EMBODIMENT

Figure 4:
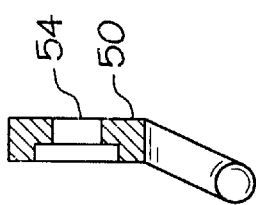
FIG. 4 is a cross-sectional view taken along line 4—4 of FIG. 3.
Figure 3:
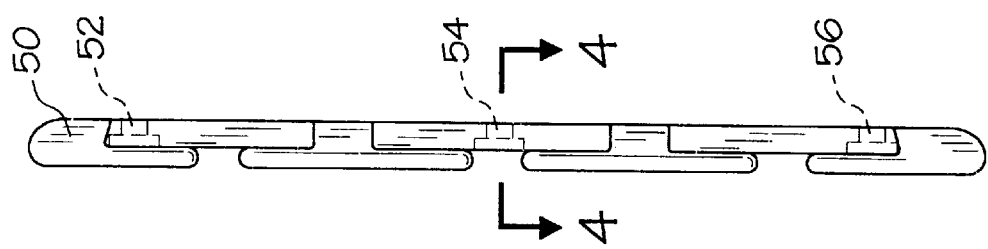
FIG. 3 is a front elevational view taken along line 3—3 of FIG. 2.

With reference now to the drawings, and in particular to FIGS. 1 through 4 thereof, the preferred embodiment of the new and improved toddler booster seat with a vehicle shoulder belt positioner embodying the principles and concepts of the present invention and generally designated by the reference numeral 10 will be described.

The present invention, the new and improved toddler booster seat with a vehicle shoulder belt positioner, is a system 10 comprised of a plurality of components. Such components, in their broadest context, include a frame, a fabric cover, padding, apertures, positioning members and rivets. Each of the individual components is specifically configured and correlated one with respect to the other so as to attain the desired objectives.

The present invention, a new and improved toddler booster car seat with a vehicle shoulder belt positioner for releasable securement to a vehicle seat through a vehicle seat belt, has as a first component, a rigid frame 12. The frame includes a generally horizontally disposed seat portion 14 with an upper surface 16 for receiving the seat of a child and a lower surface 18 for being positioned on the seat of a vehicle. The frame also includes a back portion 20 integrally formed with the seat portion with an exterior surface 22 for receiving the back of a child and an interior surface 24 for being positioned on the back of a vehicle seat. The back portion extends generally upwardly from the rear edge of the seat portion.

The second major component of the present invention is a fabric cover 28. The fabric cover is provided to fit over the booster seat frame.

Next provided as a component of the present invention is padding 32. The padding is located between the fabric and rigid frame.

Further, the rigid frame of the back portion is formed with rigid lateral edges 36. The fabric located thereadjacent is formed with elongated apertures 38.

Additionally provided are three apertures 40, 42, 44 formed in the back portion of the frame. The three apertures are located in the upper extent of the back portion of the frame with their centers in an arcuate configuration.

Also provided as a component of the system 10 is a pair of generally rigid plastic positioning members 48, 50 of a similar configuration. The positioning members are formed in an arcuate configuration. Further, they are symmetrically formed from top to bottom with three apertures 52, 54, 56 located through each member adjacent to its inner edge. Each aperture has an enlarged cylindrical end for receiving a rivet head. The positioning members also have three T-shaped notches 58, 60, 62 extending inwardly from the outer edge, each T-shaped notch having a narrow linear radial extent 64 terminating in an enlarged circumferential extent 66 adapted to receive the fabric of a vehicle seat belt. The portions of the positioning members on opposite sides of the radial extents have a circular cross-sectional configuration. The outer edge of each notch is beveled along its length at an angle toward the enlarged cylindrical ends and the inner edge is planar for contacting the frame with its apertures in axial alignment with the apertures of the frame.

The last component of the present invention includes three rivets 68, 70 72. The three rivets extend through the apertures of the frame for holding the positioning members to the frame interior of the fabric with the T-shaped notches extending through the elongated apertures to exterior of the fabric.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A new and improved toddler booster car seat with a vehicle shoulder belt positioner for releasable securement to a vehicle seat through a vehicle seat belt comprising, in combination:

a rigid frame including a generally horizontally disposed seat portion with an upper surface for receiving the seat of a child and a lower surface for being positioned on the seat of a vehicle, the frame also including a back portion integrally formed with the seat portion with an exterior surface for receiving the back of a child and an interior surface for being positioned on the back of a vehicle seat, and extending generally upwardly from the rear edge of the seat portion;

a fabric cover over the booster seat frame;

padding located between the fabric and rigid frame;

the rigid frame of the back portion being formed with rigid lateral edges and with the fabric thereadjacent being formed with elongated apertures;

three apertures formed in the back portion of the frame in the upper extent thereof with their centers in an arcuate configuration;

a pair of generally rigid plastic positioning members of a similar configuration formed in an arcuate configuration and symmetrically formed from top to bottom with three attachment apertures located through each member adjacent to its inner edge, each attachment aperture having an enlarged cylindrical end for receiving a rivet head and with three T-shaped notches extending inwardly from the outer edge, each T-shaped notch having a narrow linear radial extent terminating in an enlarged circumferential extent adapted to receive the fabric of a vehicle seat belt, the portions of the positioning members on opposite sides of the radial extents having a circular cross-sectional configuration, the outer edge being beveled along its length at an angle toward the enlarged cylindrical ends and the inner edge being planar for contacting the frame with its apertures in axial alignment with the apertures of the frame; and three rivets extending through the attachment apertures and through the apertures of the frame for holding the positioning members to the frame interior of the fabric with the T-shaped notches extending through the elongated apertures to the fabric so as to be exposed for receiving the vehicle seat belt.

2. A toddler booster car seat comprising:

a rigid frame including a generally horizontally disposed seat portion with an upper surface for receiving the seat of a child and a lower surface for being positioned on the seat of a vehicle, the frame also including a back portion integrally formed with the seat portion and extending generally upwardly from the rear edge of the seat portion;

the rigid frame of the back portion being formed with rigid lateral edges;

a plurality of apertures formed in the back portion of the frames;

at least one positioning member formed with a plurality of attachment apertures located therethrough adjacent to its inner edge and a plurality of notches extending inwardly from the outer edge, each notch having a narrow linear radial extent terminating in an enlarged circumferential extent adapted to receive the fabric of a vehicle seat belt, portions of the positioning member positioned on opposite sides of the radial extents having a circular cross-sectional configuration; and a plurality of fasteners extending through the attachment aperture and through the apertures of the frame and positioning members for holding the positioning members to the frame.

3. The booster car seat as set forth in claim 2 wherein the notches are T-shaped and each linear radial extent is positioned centrally with respect to its corresponding circumferential extent.

4. The booster car seat as set forth in claim 2 wherein the positioning members are plastic in an arcuate configuration.

5. A new and improved toddler booster car seat with a vehicle shoulder belt positioner for releasable securement to a vehicle seat through a vehicle seat belt comprising, in combination:

a rigid frame including a generally horizontally disposed seat portion with an upper surface for receiving the seat of a child and a lower surface for being positioned on the seat of a vehicle, the frame also including a back portion integrally formed with the seat portion with an exterior surface for receiving the back of a child and an interior surface for being positioned on the back of a vehicle seat, and extending generally upwardly from the rear edge of the seat portion;

a fabric cover over the booster seat frame;

the rigid frame of the back portion being formed with rigid lateral edges and with the fabric thereadjacent being formed with elongated apertures;

at least two apertures formed in the back portion of the frame in the upper extent thereof;

a pair of generally rigid plastic positioning members of a similar configuration formed in a curved configuration with at least two attachment apertures located through each member adjacent to its inner edge, each attachment aperture having an enlarged cylindrical end for receiving a fastener head, at least three T-shaped notches extending inwardly from an outer edge, each T-shaped notch having a narrow linear extent terminating in an enlarged elongated extent adapted to receive the fabric of a vehicle seat belt, the portions of the positioning members on opposite sides of the linear extents having a width dimension and a height dimension which are substantially the same for facilitating insertion and removal of the vehicle seat belt through the linear extents, the attachment apertures in axial alignment with the apertures of the frame; and at least two fasteners extending through the attachment aperture and through the apertures of the frame for holding the positioning members to the frame, the T-shaped notches extending through the elongated apertures so as to be exposed for receiving the vehicle seat belt.

6. The booster car seat as set forth in claim 5 wherein each linear extent is positioned substantially centrally with respect to its corresponding elongated extent.

* * * * *